United States Patent [19]
Werle

[11] 3,753,574
[45] Aug. 21, 1973

[54] TRAILER CONSTRUCTION
[76] Inventor: Arnold Werle, Attendornerstr. 9, Plettenberg-Oesterau, Germany
[22] Filed: June 8, 1971
[21] Appl. No.: 151,075

[30] Foreign Application Priority Data
June 8, 1970 Germany............... P 20 28 080.2
May 21, 1971 Germany............... P 21 25 236.8

[52] U.S. Cl. ................................ 280/478 A, 188/3
[51] Int. Cl. ........................................... B62d 53/00
[58] Field of Search ............... 280/478 R, 478 A, 280/477, 479

[56] References Cited
UNITED STATES PATENTS
1,422,189  7/1922  Eckertz ....................... 280/478 A
2,988,383  6/1961  Carson ......................... 280/478 A
3,243,202  3/1966  Carson ......................... 280/478 A
3,126,210  3/1964  Hill .............................. 280/478 A Primary Examiner—Leo Friaglia
Attorney—Michael S. Striker

[57] ABSTRACT

A trailer has a hitch connected to its front end, and to the free end portion of the hitch is mounted an elongated coupling member which can slide longitudinally of itself as well as turn about an upright axis with respect to the hitch. Arresting devices are provided which can prevent the coupling member from sliding and turning when it assumes a predetermined position with reference to the hitch, and on a terminal portion of the coupling member a coupling is provided by means of which the coupling member can be connected with a cooperating coupling on a traction vehicle.

11 Claims, 11 Drawing Figures

Patented Aug. 21, 1973

INVENTOR
ARNOLD HERLE
BY
Adolf J. Stuht
Attorney

TRAILER CONSTRUCTION

BACKGROUND OF THE INVENTION

The present invention relates generally to a trailer construction, and more particularly to a construction of a trailer and hitch combination.

To avoid misunderstandings it is pointed out that the term "trailer hitch" as employed hereinafter is intended to refer to that part of the trailer coupling which is connected with the trailer itself, not with the traction vehicle such as a truck or the like.

Broadly speaking there are two types of vehicle and trailer arrangements in wide use today. The first type is the so-called "tractor-trailer rig" or combination in which the tractor vehicle has a cab and, located rearwardly of the cab, a coupling arrangement. The trailer usually has only a rear axle (or sometimes more than one rear axle) whereas its front end has neither an axle nor wheels but instead is supported on the rear end of the tractor vehicle, being coupled with the coupling arrangement of the latter. The rear wheels of the tractor vehicle thus serve simultaneously as the front wheels of the trailer and the latter turns about an upright pivot axis which is coincident with the coupling arrangement on the tractor vehicle.

The other type, with which the present invention is concerned, utilizes a trailer which has both rear wheels and front wheels, with the front wheels being mounted for turning movement about an upright axis, that is the front axle of the trailer is so mounted. Connected with the front wheels, usually with the front axle, is a hitching arrangement which projects forwardly from the trailer and whose free end portion is connected with a cooperating arrangement provided on a tractor vehicle. Unlike the tractor-trailer rig, in this second type of construction the tractor vehicle need not be of a special type, but instead can be (for instance) a conventional truck or the like.

The type of trailer which is used in the secondmentioned arrangement is provided with brakes which are usually activated in a sense blocking the front wheels of the trailer, when the hitch is detached from the tractor vehicle. Generally speaking, the hitch is pivotable about a horizontal pivot axis and for connection to the tractor vehicle it must be raised. Consequently, when it is disconnected and let go, the hitch will pivot downwardly and in the known constructions the arrangement is generally such that the weight of the hitch during such downward pivoting will activate the front brakes of the trailer, hydraulically or pneumatically or in other suitable manner.

Naturally, the purpose of this more or less automatic activation of the front wheel brakes of the trailer is to prevent the latter from rolling off after it is disconnected from the tractor vehicle. This requirement is generally fulfilled by the known constructions. However, experience has shown that during the disconnecting of the hitch, and particularly during the reconnecting of the hitch to the traction or tractor vehicle, with these known constructions a substantial danger of injury to the operator exists. The reason for this is that after disconnecting the hitch from the traction vehicle it is a frequent occurrence that in the brief moment before the front wheel brakes become activated the front wheels will turn sideways and, as a consequence, the hitch swings sideways with them, bringing with it the danger that it may cause physical injury to the operator or bystanders. The problem can be somewhat mitigated during disconnecting of the hitch from the traction vehicle in that the connecting means or coupling means are released without actually effecting a disconnecting of the hitch from the tractor vehicle, whereupon the tractor vehicle is then driven forwardly so that the hitch will become separated from it and will pivot downwardly under its own weight, thereby activating the brakes. During this occurrence the driver of the vehicle of course controls the movement of the vehicle and is out of the range of danger, and bystanders will presumably have been warned and will stand far enough back to avoid injury when and if the hitch swings laterally. Of course, frequently such warnings to the bystanders are forgotten and sometimes they are simply not heeded.

No such precautions can be taken, however, when the hitch has to be reconnected to the traction vehicle. At least one operator must then be present under all circumstances to effect the necessary reconnection and he must work within the range of movement of the hitch should the latter swing laterally. The difficulty is that there are many circumstances, including uneven or rough terrain or a change in the loading of the trailer, which will cause the front wheels of the trailer to have a tendency at the moment at which the brakes are released (by raising the hitch to a position in which it can be coupled with the traction vehicle) to move laterally. This cannot always be predicted and such movement takes place at considerable speed and force and represents a substantial danger for an operator.

In addition it will be appreciated that it is very difficult for the vehicle operator himself to so maneuver the vehicle backwardly, especially if the terrain is uneven or otherwise unfavorable, that the coupling on the traction vehicle will be located properly positioned relative to the hitch of the trailer so that a connection between them can be readily carried out. This is espcially true when the vehicle driver is alone and does not have a second person available for the purpose of guiding him in directing the vehicle to a proper position with reference to the trailer. Especially when the vehicle driver is alone, he is therefore almost always forced to raise the hitch—thereby releasing the front wheel brakes—and to move the hitch and at least the front wheels in order to effect the proper positioning of the hitch with reference to the coupling of the vehicle so that they can be connected. This, of course, brings with it the aforementioned danger of injury due to undesired and unforeseen movements of the front wheels and also the hitch.

SUMMARY OF THE INVENTION

It is, accordingly, an object of the present invention to avoid the aforementioned difficulties and disadvantages.

More particularly it is an object of the present invention to provide, in a trailer, a combination including hitch means which avoids these problems.

Still more particularly it is an object of the present invention to provide an improved hitch means of the type under discussion which permits a simple, rapid and safe connecting and disconnecting of a trailler with respect to a traction vehicle.

In pursuance of the above objects, and of others which will become apparent hereafter, one feature of the invention resides in a trailer, wherein the invention comprises a combination of trailer means having wheels and hitch means connected with the trailer means and projecting forwardly thereof. An elongated coupling member is mounted on a free end portion of the hitch means, being slidable longitudinally of itself and having freedom of at least pivotable movement. The coupling member has a terminal section provided with coupling means which is adapted for releasable connection with a coupling on a traction vehicle. Arresting means are provided for arresting the coupling member when the same assumes a predetermined position with reference to the hitch means.

With this construction it is possible to effect connecting and disconnecting of the trailer with respect to a traction vehicle simply by manipulating the coupling member without having to move the hitch means itself, and thus without having to influence the front wheels of the trailer.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Discussing now the drawing in detail, and firstly the embodiment which has been illustrated in FIGS. 1–7, it will be seen that with reference numeral 1 I have identified a fragmentarily illustrated traction vehicle, such as a truck. Only the rear end portion of the vehicle 1 has been shown, and the rear wheels have been suggested for purposes of orientation. The rear end portion of the vehicle 1 carries a conventional coupling 2, to which a trailer hitch is to be connected.

Figure 1:
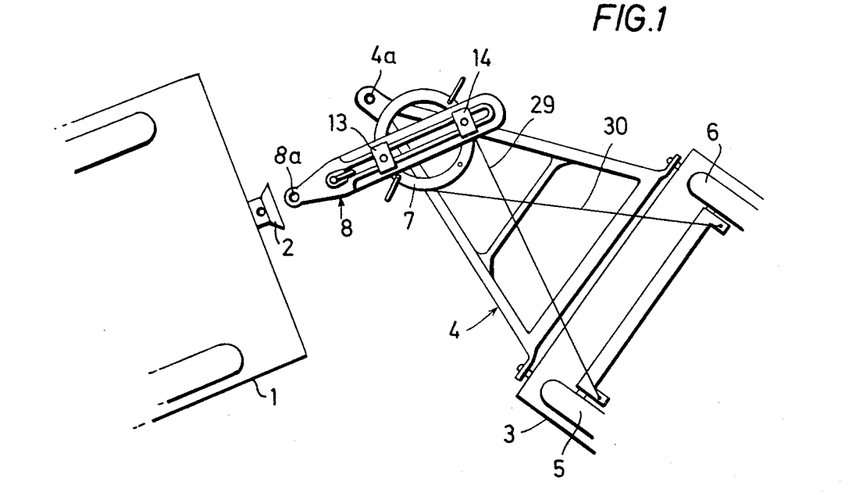
FIG. 1 is a simplified diagrammatic top-plan view of one embodiment of the invention in fragmentary form.

There is also shown in FIG. 1 diagrammatically and fragmentarily the front end portion of a trailer 3, with the front wheels 5 and 6 again having been diagrammatically suggested for purposes of orientation. Connected to the trailer 3 at the front end portion thereof is a trailer hitch 4 of conventional construction which, also in conventional manner, is connected with the front wheels 5 and 6 of the trailer 3, it being understood that the wheels 5 and 6, or the axle thereof, can turn with reference to the trailer 3 about a vertical axis, and that the hitch 4 can turn with it.

Figures 2, 3:
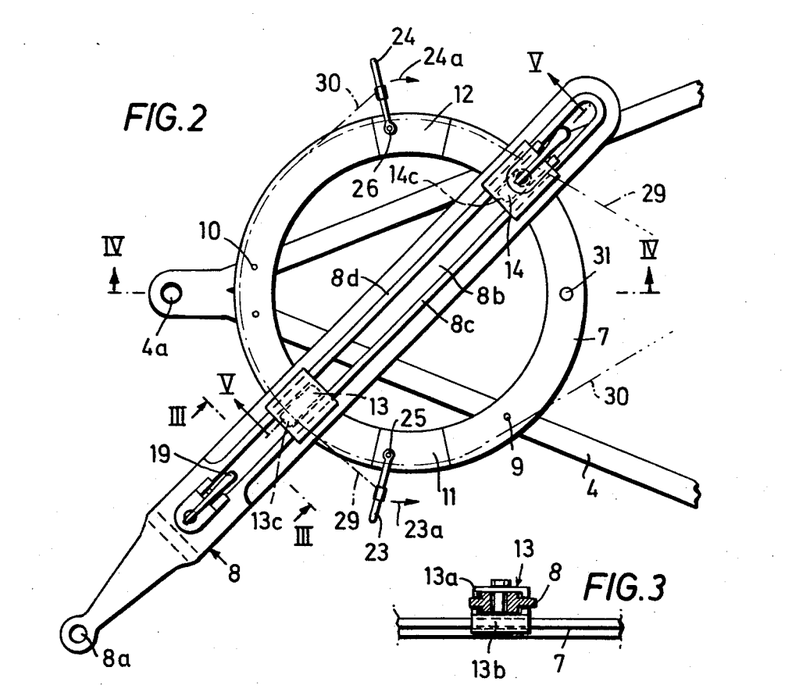
FIG. 2 is a top-plan view, on an enlarged scale, illustrating a detail of FIG. 1.
FIG. 3 is a section taken on line III—III of FIG. 2.
Figure 4:
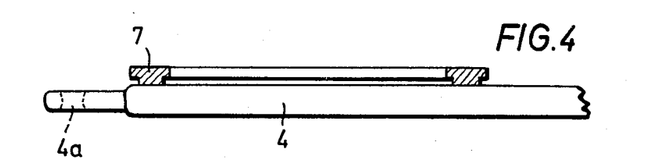
FIG. 4 is a simplified section, with portions omitted for clarity, taken on line IV—IV of FIG. 2.
Figure 5:
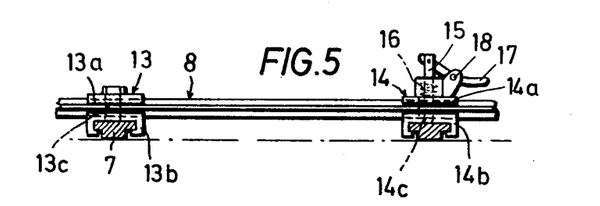
FIG. 5 is a section taken on line V—V of FIG. 2.

The front end portion or free end portion of the hitch 4 is, again in conventional manner, provided with a hitching eye 4a. Unlike the conventional constructions, however, the front or free end portion of the hitch 4 is additionally provided with a ring mount 7 which may for instance be secured to it by means of recessed bolts or screws 9, 10 so as to be fast with the hitch 4 (see also FIG. 2). FIGS. 4–7 show the cross-sectional configuration of the ring mount 7 more clearly, and it will be seen that this is essentially of T-shaped outline in the illustrated embodiment. Abutment plates or members 11 and 12 are secured at lateral locations of the ring mount 7 to the latter, for instance by means of welded seams, screws or the like. As will be subsequently explained, the purpose of the abutments 11 and 12 is to limit pivoting movement of the coupling member 8 which is composed, in this particular embodiment of an elongated member, the latter being mounted by means of guide elements 13 and 14 on the ring mount 7. In the illustrated embodiment the member 8 is provided with a longitudinally extending slot 8b through which the guide elements 13 and 14 extend, and the member 8 is mounted with reference to the ring mount 7 for pivoting movement about an upright axis as well as for displacement in direction longitudinally of itself. FIG. 3 shows the currently preferred cross-sectional configuration of the member 8, but this is not to be considered limiting.

The guide members 13 and 14 are each provided with a low-profile substantially U-shaped cover portion 13a and 14a, respectively, with the two legs of the profile extending around and embracing the upper rail portion 8c, 8d. A connecting portion 13c, 14c—which may be of bolt-shaped or rectangular configuration—extends from the respective cover portions 13a, 14a to lower portions 13b, 14b of the respective guide members. The lower portions preferably embrace both a part of the underside of the member 8 and also the ring mount 7 (compare FIG. 5).

The drawing, and particularly FIG. 2, also shows that the guide member 14 is provided with an arresting arrangement having a pin or bolt 15 which is biased by a spring 16 tending to displace the pin 15 downwardly so that, when the member 8 is in the position which it normally assumes with reference to the hitch 4 and the ring mount 7, the pin will extend into a bore 31. A manually operable lever 17 is provided which is hinged or pivoted at 18 and which, when depressed, engages the pin 15 and lifts it against the biasing force of the spring 16, thereby withdrawing the pin 15 from the bore 31 so that the member 8 can now be pivoted about its aforementioned upright pivot axis.

Figure 6:
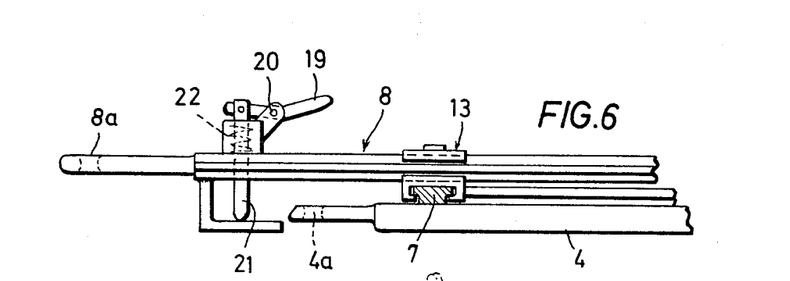
FIG. 6 is a partly sectioned side view, illustrating a detail of FIG. 1.
Figure 7:
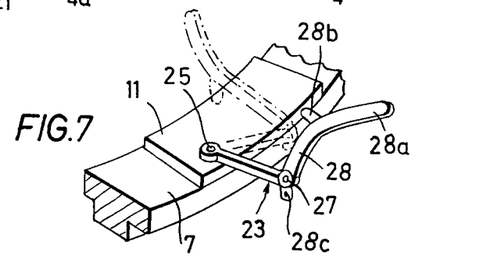
FIG. 7 is a fragmentary partly sectioned detail view, in perspective, of an arrangement for use in the embodiment of FIG. 1.

In addition, however, a second arresting device is provided, located in the region of the front end of the member 8 as illustrated in FIGS. 2 and 6. This device again has a manually operable handle or lever 19 mounted on and for pivoting movement about a shaft or axis 20. This device further comprises an additional pin 21 which is biased by a spring 22 so as to normally engage in the eye 4a, that is when the member 8 is in the position which it normally assumes with reference to the hitch 4 during regular operations, that is when the hitch 4 connects the trailer 3 with the tractor vehicle 1. When the two just described arresting devices are disengaged, the member 8 can be freely turned about the aforementioned upright pivot axis with reference to the ring mount 7 and between the two abutments 11 and 12; in addition the member 8 can be displaced longitudinally of itself, and as FIG. 2 shows it is provided on its front end with a coupling eye 8a.

The ring mount 7 further carries a manually operable device for engaging or releasing the front wheel brakes of the trailer, that is those which are to be engaged to prevent the trailer from rolling off, and which must be disengaged before the trailer can be pulled by the vehicle 1. It is advantageous that this arrangement is so constructed that the brakes for the two front wheels 5 and 6 of the trailer can either be activated or disengaged individually, or in unison. The device is shown particularly in FIGS. 2 and 7 and it will be seen that it primarily comprises two manually operable handles or levers 23 and 24 each of which is mounted on the ring mount 7 for movement about a vertical axis of shaft 25, 26, respectively. The outer portion 28 of each of the handles 23 and 24 is connected to the respectively inner portion by means of a hinge 27 so as to be capable of displacement about an essentially horizontal axis. This means that if for instance the brake of one of the wheels 5, 6 is to be engaged, each of the handles (or the respective handle) is first pivoted in the direction of the arrow 23a or 24a as shown in FIG. 2, and thereupon the portion 28 is pivoted or tilted from the outside over the ring mount 7. A projection 28b serves to arrest the portion 28 in the broken line position shown in FIG. 7.

A portion 28a provided on the portion 28 has a function which will be discussed subsequently. An abutment 28c on each of the handles 23, 24 is connected with one end of an elongated flexible tensile element, such as a wire, roper or the like 29 and 30, respectively. Each of these elements 29 and 30 is placed about a portion of the ring mount 7, as shown in FIGS. 1 and 2 and the remote ends of the elements 29 and 30 are each connected with the actuating portion of one of the front wheel brakes of the trailer 3. It is to be noted, however, that the elements 29 and 30 cross one another in space, as particularly clearly shown in FIG. 1. With this construction a simplification of operation is achieved, because the handle 23 operates the brake associated with the wheel 5 and the handle 24 operates the brake associated with the wheel 26, meaning that each handle operates the brake of that wheel which is located at the same side as the respective handle. This avoids confusion.

When it is desired to hitch the trailer 3 to the vehicle 1 as shown in FIG. 1, it is merely necessary for the vehicle to move with reference to the trailer 3 to such a position that the coupling 2 of the vehicle 1 is located in the proximity of the hitch 4, but not in a precisely predetermined relationship relative thereto as was heretofore necessary. When the vehicle 1 assumes the position which is for instance illustrated in FIG. 1 with reference to the trailer 3, one or both of the handles 23 and 24 are operated for actuating the front wheel brakes for the wheels 5 and 6. Now the levers 17 and 19 are operated to release the two above-described arresting devices, making it possible to turn and longitudinally displace the member 8 with reference to the ring mount 7 and hitch 4. It is now a simple matter to so adjust the member 8 with reference to the coupling 2 of the vehicle 1, that the coupling eye 8a of the member 8 becomes lodged in the coupling 2 and can be connected therewith in conventional manner. Even if the hitch 4 is lifted during this operation, this will not provide any danger for the operator because the front wheel brakes remain applied or engaged until they are purposely and manually released again, that is they do not become released merely by raising the hitch 4. Thus, the danger of lateral movements of the hitch 4 and consequent possibility of injury to an operator, is avoided.

Of course, the fact that the front wheel brakes remain applied means that before the trailer can be pulled by the vehicle 1, the front wheel brakes must be again manually released. In the illustrated embodiment it has been shown that only the front wheel brake for the wheel 5 was applied and consequently only this brake will have to be released manually. It is pointed out in this connection that as a rule it will not be necessary to operate both front wheel brakes, and that usually the operation of one of the front wheel brakes will be sufficient; generally speaking the brake to be activated will be that which is associated with the front wheel of the trailer 3 from whose side the vehicle approaches the trailer, that is in the illustrated embodiment the front wheel 5 whereas, if the vehicle 1 were to approach from the other side, it would be the front wheel 6.

When a connection is established as in FIG. 1, and it will be understood that to do so it is now merely necessary to slide the member 8 longitudinally of itself until the portion carrying the eye 8a enters into the coupling 2 and is connected therein, the vehicle 1 and the trailer 3 are connected for joint movement. When the vehicle 1 now begins to move, the hitch pivots about its upright pivot axis turning the front wheels 5 and 6 so that the trailer 3 will follow the vehicle 1. As a result of this the member 8 will move to a position of longitudinal alignment with the elongation of the hitch 4 as it pivots with respect to the latter (or as the latter pivots with respect to it) about the upright pivot axis of the member 8 on the ring mount 7. The member 8 will then overlie the aperture or eye 4a and will at this time have assumed its normal or ordinary predetermined position with reference to the hitch 4. At such time the bolt 15 or pin 15 of FIG. 5 will automatically enter (under the urging of its associated biasing means) the bore 31 shown in FIG. 2. The first time the brakes of the vehicle 1 are applied, the trailer 3 will approach somewhat closer to the vehicle than was the case until such time thereby displacing the member 8 longitudinally of the latter, so that the eye 4a moves beneath the pin 21 (whose lower end portion is bevelled as shown in FIG. 6), whereby the latter will also be automatically urged to enter into the opening 4a by its associated biasing means. Both of the arresting devices are now again engaged and the member 8 is arrested in its normal or predetermined ordinary position with reference to the hitch 4. During the pivoting movement of the member 8 from the position shown in FIGS. 1 and 2 to its normal predetermined position, the lateral edge of the member 8 moves beneath the portion 28a mentioned earlier, so that the portion 28 of FIG. 7 is raised, the abutment 28b is freed and the lever 23 is returned to its rest position shown in FIG. 2, thereby effecting a release of the brake of the front wheel 5 of the trailer 3, if such release has not already previously been effected manually. Of course, this feature could be omitted and it is possible to rely exclusively on manual release, but the automatic release is preferred because it takes into account the possibility that manual release might inadvertently be forgotten.

Undesired lateral displacement of the hitch 4 is of course avoided in that the levers 23 and 24 each operate the brake associated with the front wheel 5 or 6 which is diametrally opposite the respective lever, and a further advantage of this arrangement is that the partial or complete braking of a wheel of the front axle of the trailer 3 substantially prevents movement of the trailer 3 under the influence of its own weight.

Figures 8, 9:
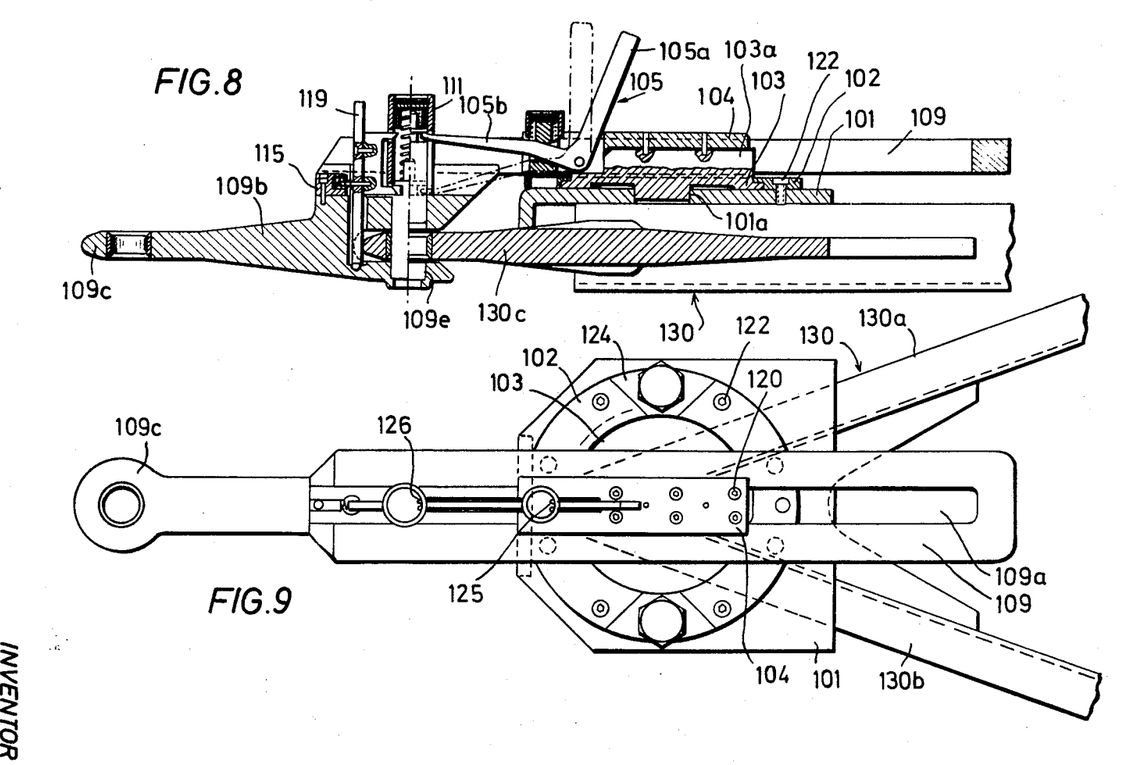
FIG. 8 is a fragmentary vertically sectioned detail view illustrating a further embodiment.
FIG. 9 is a top-plan view of the embodiment in FIG. 8.
Figure 8A:
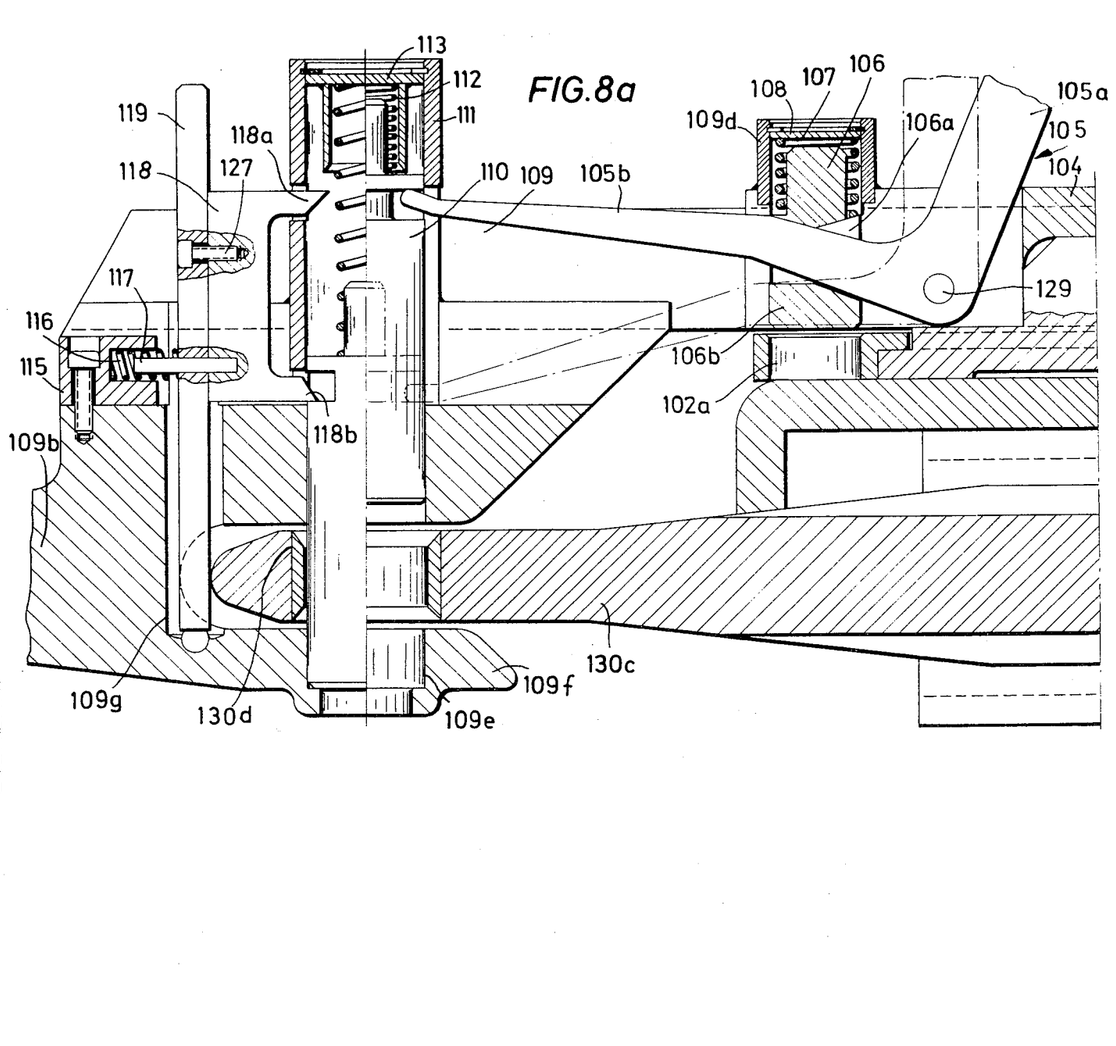
FIG. 8a is a view similar to FIG. 8 but illustrating a detail of that Figure on an enlarged scale.

A further embodiment of the invention is illustrated in FIGS. 8, 8a and 9. In these Figures a hitch such as is widely used is identified with reference numeral 130 and will be seen to have two arms 130a and 130b, as well as a rod portion 130c. The front end of the rod portion 130c is provided with an eye 130d which heretofore was inserted into the coupling (see element 2 in FIG. 1) of a traction vehicle. According to the invention a plate member 101 is made fast with the hitch 130 in the region of the free end portion thereof, the connection being effected by means of screws, bolts, welds or in other suitable manner. A guide ring 102 is mounted on the plate member 101 by means of screws 122, preferably screws which are to be operated by means of Allen wrenches and for this reason have an Allen-wrench socket. FIG. 8 shows the cross-section configuration of the guide ring 102, which latter turnably accommodates within its confines a turnable disk member 103 which is also secured to the plate member 101 via a bore 101a of the latter. A rectangular cover 104 is provided on the plate member 103, preferably secured thereto by means of screws such as Allen-head screws. A coupling member 109 corresponding to the coupling member 8 in the preceding embodiment, is mounted on the plate member 103 being longitudinally shiftable. FIG. 9 shows that the member 109 is provided with a longitudinally extending slot 109a and that a rectangular guide portion 103a of the plate member 103 extends into this slot. The cover 104 is wider than the slot 109a so that it extends about the edges of the member 109 at both opposite sides, as evident in FIG. 9. The member 109 is downwardly offset in direction towards its front end portion, as shown in FIG. 8, so that the portion 109b with the eye 109c is located substantially at the same level as the portion 130c of the hitch 130.

A double-armed angled lever 105 is mounted in the member 109 about a horizontal pivot axis by means of a bolt 129 as shown in FIG. 8. One arm 105a of the lever 105 is constructed as a handle and the other arm 105b cooperates with arresting devices which will be discussed hereafter.

One of these arresting devices arrests the disk member 103 against turning movement, and therefore prevents corresponding pivoting or turning movement of the member 109 with respect to the hitch 130. A second arresting device is provided for preventing longitudinal displacement of the member 109. The first of these arresting devices utilizes a vertically displaceable bolt or pin 106 provided with a recess 106a through which the arm 105 extends. The bolt 106 is urged by a biasing spring 107 the lower end of which abuts against a horizontal annular surface and the upper end of which abuts against a cover 108 which is held in place by a mounting and securing ring 125. A housing 109d secured to the member 109 surrounds the upper ends of the pin 106 and the spring 107 and is of cylindrical configuration. In the arrested position the lower end 106b of the pin 106 extends into a vertical bore 102a of the guide ring 102.

The other arresting device, that is the one which prevents longitudinal displacement of the member 109, also provides a vertically guided bolt or pin 110 which is biased by a spring 112. In FIG. 8 the two end positions of the pin 110 have been illustrated, the left-hand side of the pin having been shown in its lower position in which it performs the desired arresting function whereas the righthand side of the pin is shown in its upper position in which the device is de-activated and does not arrest the member 109 against longitudinal displacement. As in the preceding arresting device, the upper portion of the pin 110 and of the spring 112 is surrounded by a housing configurated as a tubular member 111 which also performs a guidance function for the elements 110 and 112. The upper end of the housing 111 is provided with a cover 113 which is held in place by a securing ring 126.

When the pin 110 is in its lower or arresting position as shown in FIG. 8, its lower end extends through the eye 130d and into a bore 109a of a portion 109f which extends beneath the eye 130d.

There is further provided a vertically oriented safety or detent pin 119 which is held by a pin 117, the latter in turn being mounted in a guide member 115 and being under the influence of a biasing spring 16. The pin 119 which is thus displaceably mounted extends through a bore 109g to the region of the eye 130d. In the region of its upper end the pin 119 further carries a detent portion 118 which is of approximately U-shaped (generally hook-shaped) configuration and which engages the pin 110, with the connection of the portion 118 to the pin 119 advantageously being carried out by means of screws such as Allen-head screws 127.

When a trailer provided with the embodiment of FIGS. 8, 8a and 9 is to be connected with a traction vehicle, the lever 105 is manually operated, meaning that it is moved into the position which is shown in FIG. 8 in full lines. This pivoting movement of the lever arm 105a in clockwise direction raises the pin 109 against the opposition of the spring 107, and the pin 110 against the opposition of the spring 112. Before this can be done, the detent portion 118 is withdrawn from its detent position by means of the pin 119.

When the pin 110 has reached its upper or disengaged position, the upper portion 118a of the detent portion 118 engages in a recess of the pin 110, so that the disengaged position of the latter is maintained. The member 109 can now be longitudinally shifted as well as pivoted, so that the eye 109c can be moved into engagement with the cooperating coupling (see element 2 in FIG. 1) provided on the traction vehicle without having to move the hitch 130. Once this is done, a connection between the member 109 and this coupling is effected.

It goes without saying that if as is conventional the brakes of the trailer are pneumatically operated, the air hose of the trailer must be connected with the traction vehicle in conventional manner, and this is of course also true of the embodiment of FIGS. 1–7. This makes it possible for the operator of the traction vehicle to disengage the brake of the trailer from the vehicle itself, so that the vehicle can now start its movement. As a result of this the coupling member 109 will again move to its normal position with respect to the hitch 130, in the same manner as this was described with respect to the embodiment in FIGS. 1–7. The first time the vehicle brakes are applied and the trailer pushes, the rod 130c pushes against the lower end portion of the pin 119 which, because it is yieldably mounted, becomes displaced so that the portion 118a moves out of engagement with the pin 110, with the result that the latter is downwardly displaced by its biasing spring 112 and engages in the eye 130d, thereby arresting the member 109 against longitudinal displacement. At the same time the lever 105 is tilted in the position which is shown in broken lines in FIG. 8, with the result that the lower end portion of the pin 106 can enter into the bore 102a, thereby arresting the member 109 against pivotal or turning movement. The vehicle and trailer are now coupled for joint travel.

In this connection a brief explanation with respect to the operation of the brakes of the trailer, which prevent the trailer from rolling when it is disconnected from a vehicle, is in order. Generally speaking, such constructions utilize brakes which are activated by compressed air and which are connected for this purpose with an air hose with a source of compressed air in the vehicle. A control valve provided on the trailer and including a braking force regulator, controls the operation of the brakes on the trailer. It is proposed according to the invention that an additional valve be connected with the control valve, being positioned at an appropriate location, advantageously on the hitch, and which can be manually operated. The construction of the valve must be such that when it is closed the brake or brakes of the trailer will remain engaged, independently of any movements of the hitch and also independently of a disconnection of the air hose from the traction vehicle. This means that before the lever 105 is operated, the additional valve is closed so that the trailer is blocked against undesired movement. Thereupon the hitch can be disconnected from the traction vehicle, and later on can be reconnected with the traction vehicle, and the member 109 can be turned and longitudinally displaced with reference to the hitch 130 in the manner discussed above, without having to fear any displacement of the hitch 130 and/or the trailer itself. Once the trailer is coupled with a traction vehicle, the separately manually operable valve according to the invention is opened, so that the brakes can then be released or engaged, as desired or necessary, from the vehicle itself in conventional manner.

Lateral abutments 124 provided on the ring 102, for instance secured thereto by means of screws or the like, limit the pivoting movement of the member 109 in the illustrated embodiment.

Figure 10:
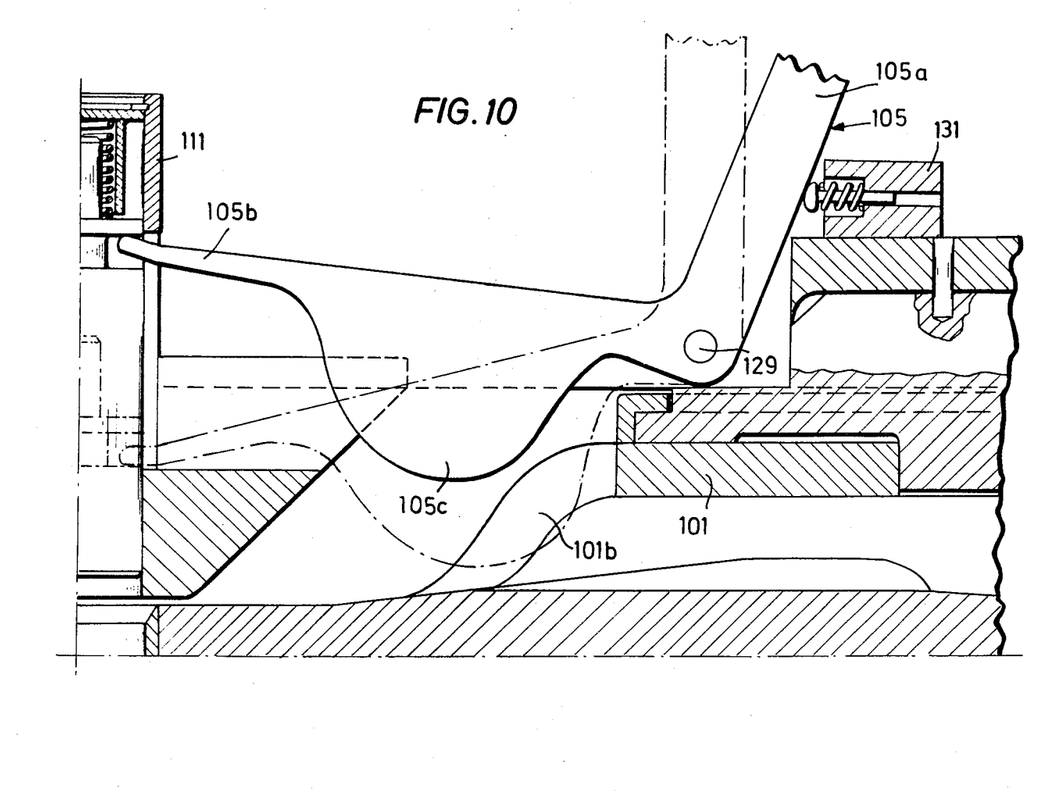
FIG. 10 is a view similar to FIG. 8a but illustrating a further embodiment of the invention.

Coming, finally, to the embodiment illustrated in FIG. 10 it will be seen that the view of this Figure corresponds substantially to the view in FIG. 8a, but differs from the embodiment of FIGS. 8, 8a and 9 in that the pin 106 with its associated spring and housing has been omitted. Instead, the embodiment in FIG. 10 is provided on the lower portion of the arm 105b of the lever 105 with a vertically downwardly slanting plate-shaped projection 105c which in the arresting position extends between two lateral abutments of the ring, or as shown in FIG. 10 between two abutments or into a slot 101b of the plate member 101. This permits the construction of FIG. 10 to be simpler than that of FIGS. 8 and 9.

FIG. 10 also shows that it is possible to provide on the arm 105a a diagrammatically illustrated actuating device 131 for the previously mentioned additional valve for the trailer brakes, whereby the operation of such a valve is simplified and more readily accessible. When the lever 105 is moved to disengaged position, an actuating member or the like at the same time acts upon this additional valve to close it, whereas when the arm is moved to engaged position which is shown in broken lines in FIG. 10, the valve will automatically be permitted to open by disengagement with the projection.

The illustrated embodiments should be understood as being purely exemplary and should not be considered limiting in any sense. Clearly, modifications and changes are possible and will offer themselves to those skilled in the art, without thereby having to deviate from the inventive concept. It is also emphasized that the constructions illustrated herein and described, have the additional advantage besides those already pointed out that they can be constructed as compact relatively light-weight and relatively inexpensive units, and that they need not be incorporated as part of the original hitch design but can be added to an existing hitch, thereby making it possible to convert existing trailer constructions to the highly advantageous and considerably safer operation disclosed herein, at relatively low expense and with relatively little difficulty.

It will be understood that each of the elements described above, or two or more together, may also find a useful application in other types of constructions differing from the types described above.

While the invention has been illustrated and described as embodied in a trailer construction, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended

1. In a trailer, in combination, trailer means having wheels; hitch means connected with said trailer means projecting forwardly thereof and having a free end portion having apertures; an elongated coupling member having a terminal section; coupling means mounted on said terminal section and adapted for releasable connection with a coupling on a traction vehicle; mounting means for mounting said coupling member on said free end portion and including a ringmount having apertures and being fast with said free end portion; guide elements mounting said coupling member on said ringmount for sliding displacement longitudinally of said coupling member and for turning displacement about an upright axis; and arresting means for arresting said coupling member when the same assumes a predetermined position with reference to said hitch means, said arresting means comprising a pair of arresting devices each including spring-biased bolts adapted to enter into said apertures when said coupling member is in said predetermined position with reference to said hitch means, and manually operable means for displacing said pins out of said apertures at the choice of an operator.

2. In a trailer, in combination, trailer means having wheels; hitch means connected with said trailer means projecting forwardly thereof and having a free end portion; an elongated coupling member mounted on said free end portion slidable longitudinally of itself and with freedom of at least pivotal movement, said coupling member having a terminal section; coupling means on said terminal section and adapted for releasable connection with a coupling on a traction vehicle; mounting means mounting said coupling member on said free end portion of said hitch means and including a ringmount fast with said free end portion and guide elements mounting said coupling member on said ringmount for sliding displacement longitudinally of said coupling member and for turning displacement about an upright axis, said coupling member being provided with at least one longitudinally extending slot, and said guide elements being provided on said ringmount and extending into said slot so as to guide said coupling member during sliding movement of the latter relative to said ringmount; and arresting means for arresting said coupling member when the same assumes a predetermined position with reference to said hitch means.

3. In a trailer, in combination, trailer means having wheels; hitch means connected with said trailer means projecting forwardly thereof and having a free end portion; a coupling element being substantially bar-shaped and having a front portion provided with coupling means and a rear portion provided with coupling means and a rear portion; a plate member mounted on said free end portion of said hitch means; a ring member mounted on said plate member; a disc member mounted within the confines of and turnable relative to said ring member; connecting means connecting said rear portion of said coupling element with said disc member for turning movement therewith and for sliding movement relative to said disc member in longitudinal direction of said coupling element; and arresting means for arresting said coupling member when the same assumes a predetermined position with reference to said hitch means.

4. In a trailer as defined in claim 2; further comprising abutment means provided on said coupling member and ringmount, for limiting turning displacement of the former relative to the latter.

5. In a trailer as defined in claim 3, said arresting means including arresting devices and a double-armed angled lever pivotably mounted on said coupling element and having one arm configured as a handle and an other arm connected with said arresting devices for operating the same in response to manipulation of said handle.

6. In a trailer as defined in claim 5, said hitch means having an aperture, and said arresting devices including at least one arresting device for arresting said coupling element against said sliding movement, and including a pin slidably mounted in said coupling element for movement between two positions in one of which it projects outwardly beyond said coupling element for entry into said aperture when in alignment therewith, and biasing means permanently biasing said pin toward said one position, said other arm of said lever being adapted for engagement with said pin so as to displace the latter away from said one position counter to the action of said basing means in response to manipulation of said handle.

7. In a trailer as defined in claim 6; further comprising detent means normally engaging said pin for detaining the same against undesired displacement from said one position.

8. In a trailer as defined in claim 7, said detent means comprising a detent member mounted on said coupling element with slight spacing longitudinally of the latter from said pin and having a detent portion, spring means manually urging said detent portion into engagement with said pin, said detent member being movable in a sense effecting disengagement of said detent portion from said pin.

9. In a trailer as defined in claim 8, wherein said detent portion is substantially hook-shaped.

10. In a trailer as defined in claim 5, said arresting devices including an arresting device for arresting said pivotal movement of said coupling element, comprising a recess provided in said ring member, an engaging pin guided in said coupling element for movement to and from an extended position in which it projects outwardly beyond said coupling element and into said recess when in registry therewith, and biasing means permanently biasing said engaging pin to said extended position, said other arm of said lever being arranged for engagement with said engaging pin and for displacement of the latter from said extended position in response to manipulation of said handle.

11. In a trailer as defined in claim 5, said arresting devices including an arresting device for arresting said pivotal movement of said coupling element, comprising a pair of circumferentially spaced abutments on one of said plate member and ring member, and a projection provided on said lever and adapted to engage between said abutments when said lever is in requisite position in response to manipulation of said handle.

* * * * *